No. 783,536. PATENTED FEB. 28, 1905.
R. F. McPHETRIDGE.
SPRING LINE HOLDER.
APPLICATION FILED APR. 29, 1904.
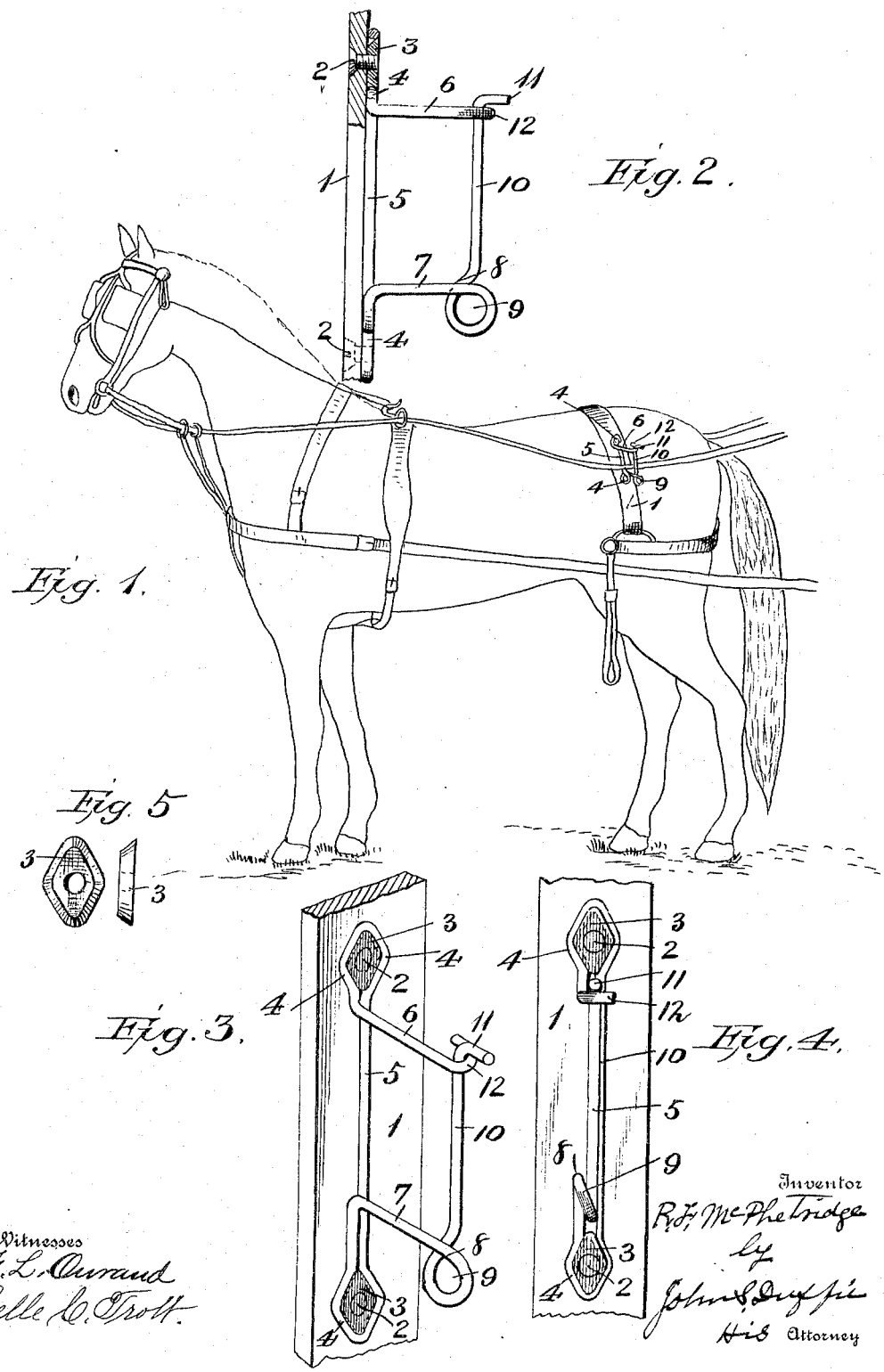

No. 783,536. Patented February 28, 1905.

UNITED STATES PATENT OFFICE.

ROY F. McPHETRIDGE, OF BENTONVILLE, ARKANSAS.

SPRING LINE-HOLDER.

SPECIFICATION forming part of Letters Patent No. 783,536, dated February 28, 1905.

Application filed April 29, 1904. Serial No. 205,624.

*To all whom it may concern:*

Be it known that I, ROY F. MCPHETRIDGE, a citizen of the United States, residing at Bentonville, in the county of Benton and State of Arkansas, have invented new and useful Improvements in Spring Line-Holders, of which the following is a specification.

My invention is a new and useful spring line-holder, and is adapted to be attached to harness, the object being to support the lines to prevent them from catching under the horse's tail or becoming entangled with the whiffletree.

This line-holder may also be used to support clothes-lines, hammocks, and the like.

In the accompanying drawings, Figure 1 is an elevation of a horse in harness, to the hip-strap of which is a perspective view of my invention. Fig. 2 is a side elevation of my invention secured to the hip-strap. Fig. 3 is an enlarged perspective elevation of my invention secured to the hip-strap. Fig. 4 is an edge elevational view secured to the hip-strap. Fig. 5 is a front and edge elevational view of the nuts.

In the accompanying drawings, the numeral 1 indicates the hip-strap to which the device is fastened is by means of rivets or screws 2, with beveled diamond-shaped countersunk nuts 3, fitting securely into diamond-shaped loops 4, made by bending the wire into the aforesaid shape. A continuous wire 5 connects these loops 4, which in turn connect with parts 6 and 7, extending up a certain distance, then out from the hip-strap. The wire 7 is extended a reasonable distance, after which it is coiled at 8, forming loop 9, which acts as a spring. A rod 10 connects with the spring 9, at the free end of which is a hook 11. The wire 6 extends almost directly out from the aforesaid diamond-shaped loops 4, at the end of which rod is a hook 12, into which hook 11 is adapted to be hooked when the lines are within for the purpose of preventing them from slipping out when drawn tightly.

Having described my invention, what I claim as new, and desire to secure by Letters Patent, is—

1. The combination with a hip-strap 1, of a base-piece 5, nuts 3 securing said base-piece to said hip-strap, screws 2, holding said nuts in place, a wire extending up and then out from said hip-strap and formed into a loop 9, and extended up again forming rod 10, at the end of which is a hook 11, a wire 6, extending out from loop at the upper end of said base-piece 5, at the end of which wire is a hook 12, which hooks with aforesaid hook 11, substantially as shown and described and for the purposes set forth.

2. A spring line-holder consisting of a single piece of spring-wire having a base-piece 5, and diamond-shaped openings 4, adapted to fit against the outer face of a hip-strap, one end of said wire extending outwardly from the lower opening, then formed into a loop 9, then upwardly, terminating in a hook 11, the other end of said wire extending outwardly, terminating in a hook 12, adapted to interlock with said hook 11, substantially as shown and described and for the purposes set forth.

3. A spring line-holder consisting of a single piece of spring-wire having a base-piece 5, and diamond-shaped openings 4, adapted to fit against the outer face of a hip-strap, one end of said wire extending outwardly from the lower opening, then formed into a loop 9, then upwardly, terminating in a hook 11, the other end of said wire extending outwardly, terminating in a hook 12, adapted to interlock with said hook 11, diamond-shaped nuts fitting into said openings, and screws passing through said hip-strap and said nuts, substantially as shown and described and for the purposes set forth.

In testimony whereof I have signed my name to this specification in the presence of two subscribing witnesses.

ROY F. McPHETRIDGE.

Witnesses:
W. J. DOKE,
H. D. HOBBS.